Sept. 19, 1950     J. DEL R. DE LAND     2,522,667
FOG DISPELLING DEVICE
Filed July 12, 1948     2 Sheets-Sheet 1
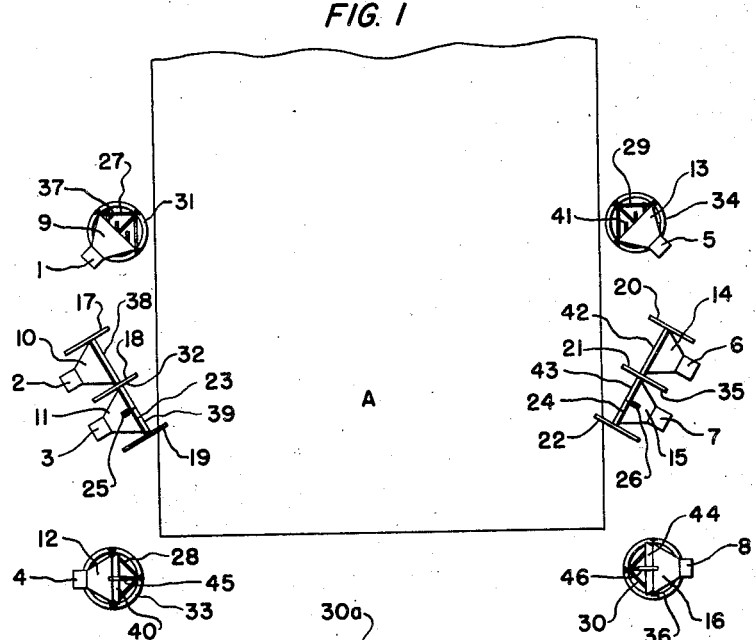
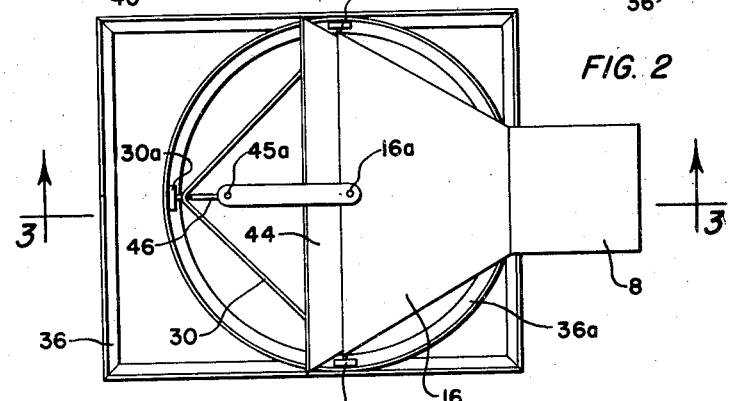
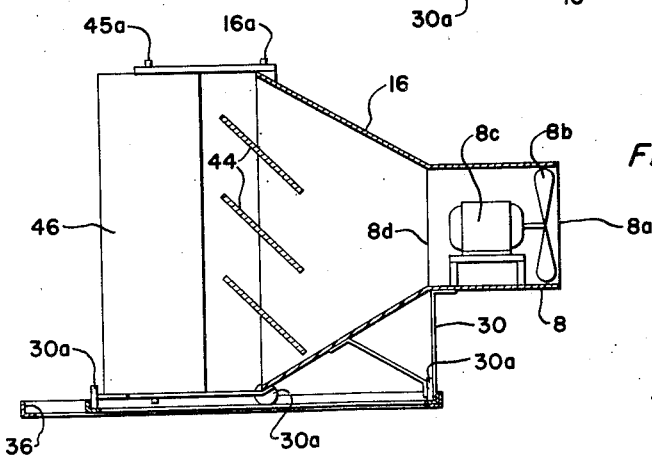
INVENTOR.
JOHN DEL REA DE LAND
BY *Wm. H. Dean*
AGENT Sept. 19, 1950 J. DEL R. DE LAND 2,522,667
FOG DISPELLING DEVICE
Filed July 12, 1948 2 Sheets-Sheet 2
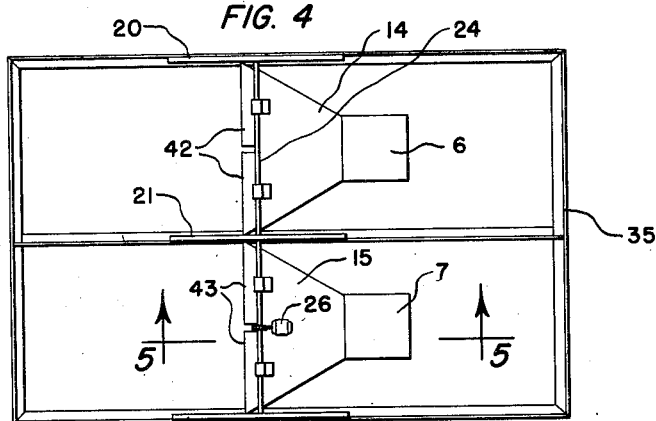
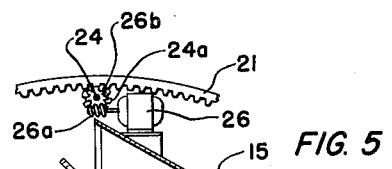
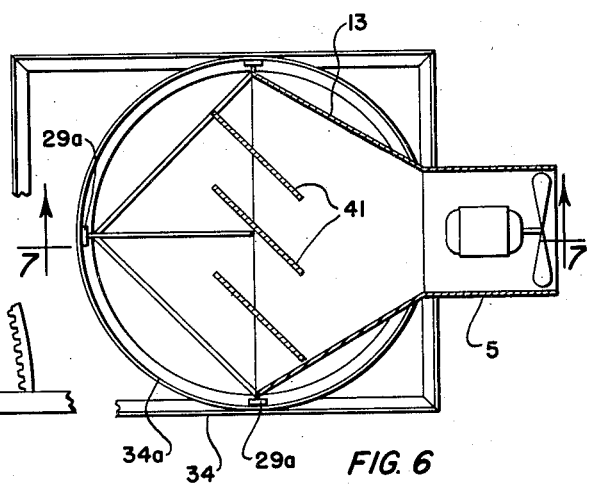
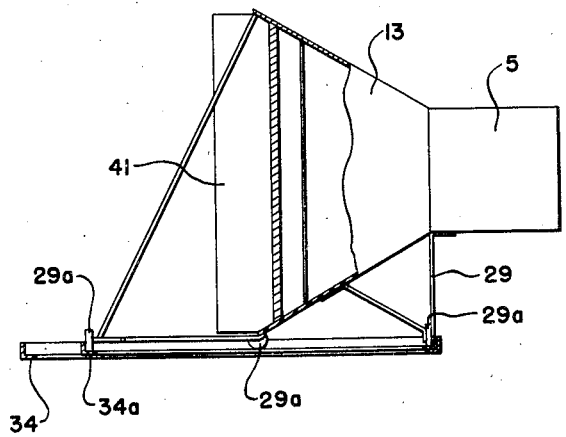
INVENTOR.
JOHN DEL REA DE LAND
BY
Wm. H. Dean
AGENT Patented Sept. 19, 1950

2,522,667

UNITED STATES PATENT OFFICE 2,522,667

FOG DISPELLING DEVICE

John Del Rea De Land, Palm Springs, Calif.

Application July 12, 1948, Serial No. 38,222

5 Claims. (Cl. 244—114)

My invention relates to a fog-dispelling device, more particularly for use in dispelling fog over the runways of airplane landing fields, so that airplanes may land without danger during adverse weather conditions, and the objects of my invention are:

First, to provide a fog-dispelling device of this class which includes a plurality of blowers having louver vanes adjacent thereto, whereby some of the vanes are adjustable about a vertical axis in connection with individual blowers, while others are pivotally adjustable about a horizontal axis in connection with other of the blowers, for accomplishing directional movement of fog longitudinally and upwardly of an aircraft landing strip, or the like;

Second, to provide a fog-dispelling device of this class having novel means for adjusting the angular disposition of louver vanes with respect to the horizontal and about a vertical axis;

Third, to provide a fog-dispelling device of this class which creates a high velocity draught along the upper surface of an aircraft landing strip and upwardly thereof, while an opposed set of blowers creates a reverse draught at the end of the landing strip, preventing fog from being replaced longitudinally of the landing strip;

Fourth, to provide a fog-dispelling device of this class in which blowers are provided with diverging walled diverters, having vanes fixed therein, the planes of which are substantially forty-five degrees to the axis of the blower, for certain directional change in the draught created by the blower, and velocity change proportional thereto;

Fifth, to provide a novel arrangement of blowers about an aircraft landing strip for dispelling fog therefrom; and Sixth, to provide a fog-dispelling device of this class which is simple and economical of construction, efficient in operation, and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, forming a part of this application, in which:

Fig. 1 is a fragmentary top or plan view of an airfield landing strip, showing my fog-dispelling device in cooperative position about one end of said landing strip; Fig. 2 is a top or plan view, showing one of the blowers of my fog-dispelling device on an enlarged scale; Fig. 3 is a sectional view taken from the line 3—3 of Fig. 2; Fig. 4 is a top or plan view of another of the blowers of my fog-dispelling device; Fig. 5 is a sectional view taken from the line 5—5 of Fig. 4; Fig. 6 is a plan sectional view of a third blower of my fog-dispelling device, showing portions thereof broken away to facilitate the illustration; and Fig. 7 is a fragmentary sectional view taken from the line 7—7 of Fig. 6, showing parts and portions in elevation to facilitate the illustration.

Similar characters of reference refer to similar parts and portions throughout the several views of the drawings.

The blowers 1 to 8, inclusive, diverters 9 to 16, inclusive, gears 17 to 22, inclusive, shafts 23 and 24, motors 25 and 26, blower frames 27 to 30, inclusive, blower bases 31 to 36, inclusive, and the louver vanes 37 to 44, inclusive, constitute the principal parts and portions of my fog-dispelling device.

As shown in Fig. 1 of the drawings, I have employed several blowers, 1 to 8, inclusive, and it will be here noted that the blowers 1 to 4 are substantially identical in construction to the blowers 5 to 8, inclusive, respectively. The blower 8, as shown in Figs. 2 and 3, is provided with an open end 8a, communicating with the fan 8b driven by the motor 8c. Communicating with the outlet end 8d of this blower 8 is the diverging diverter 16, in which the flat surface vanes 44 are fixed at an angle substantially forty-five degrees to the axis of the fan 8b, all as shown best in Fig. 3 of the drawings. The blower 8 is mounted on the blower frame 30, which is provided with a plurality of rollers 30a, adapted to traverse the circular track 36a of the blower base 36, permitting the blower to be pivotally adjusted on a vertical axis, for different directional delivery of air therefrom. The blower 5 is similar in construction to the blower 8, and communicates with a diverging diverter 13, mounted on the frame 29, having rollers 29a, traversing the circular track 34a of the blower base 34, all as shown best in Figs. 6 and 7 of the drawings. It will be here noted that while the louver vanes 44 are horizontally disposed, in the diverter 16, that the louver vanes 41 are vertically disposed in the diverter 13, and each of these louver vanes 41 is disposed at an angle of substantially forty-five degrees to the axis of the blower 5. Thus, the blower 5 is adapted to be used in diverting air horizontally of an airfield, and is adjustable about a vertical axis in order to sweep the field in various directions horizontally. The blowers 2, 3, 6 and 7 are substantially identical in construction, as shown in Fig. 1 of the drawings, and the blower 7, as shown in Fig. 5 of the drawings, is similar to the blower disclosed in Fig. 3 of the drawings, and this blower 7 communicates directly with the diverter 15, having horizontally disposed vanes 43, disposed on a plane substantially forty-five degrees to the axis of the blower 7. Mounted on the upper side of the diverter 15 is a motor 26, having a worm gear 26a in connection with the operating shaft thereof, meshing with a worm wheel 26b on the shaft 24. Fixed on this shaft 24, near the middle and near opposite ends thereof, are gears 24a, meshing with gears 20, 21 and 22. These gears 20, 21 and 22 are arcuate semi-circular gears, as shown best in Fig. 5 of the drawing. The lowermost portion of the diverter 15 is mounted in pivotal relationship with the base 35 by means of the rod 35a, all as shown best in Fig. 5 of the drawings. The diverter 15, together with the blower 7, mounted in this manner, provides for the adjustment of the axis of the blower 7 on a horizontal plane, permitting upward and downward tilting of the blower, as desired.

The operation of my fog-dispelling device is substantially as follows: When the blowers 1 and 5, as shown in Fig. 1 of the drawings, are operating, they may be adjusted about a vertical axis to provide a substantially parallel draught longitudinally of the axis of the landing strip A, or they may be adjusted to slightly converge or diverge, in accordance with the plane of the louver vanes 37 and 41, which are disposed at an angle of forty-five degrees to the axes of the blowers 1 and 5, respectively. These blowers 1 and 5, respectively, as shown in Fig. 1, are positioned on opposite edges of the landing strip A and cooperate to relieve the fog directly therebetween, while the blowers 2, 3, 6 and 7 may be adjusted on a horizontal axis to elevate the fog, and the axes of the blowers 2 and 3 converge relatively to the axes of the blowers 6 and 7, and these converging axes meet at some desirable location along the middle of the landing strip A. The upwardly inclined louver vanes 38, 39, 42 and 43, respectively, may be disposed substantially parallel to the horizontal upper surface of the landing strip A by means of the motors 25 and 26, together with the gears 17, 18, 19, 20, 21 and 22, engaged by the operating pinions disclosed in Fig. 5 of the drawings on the shafts 23 and 24. Thus, the louver vanes 38, 39, 42 and 43, may be disposed at an angle of forty-five degrees or greater, to the horizontal, or may be disposed substantially parallel thereto, as desired, in accordance with the particular dimensions of the airfield and the particular ceiling requirements for landing thereon, so that the fog may be elevated in accordance therewith. It will be here noted that the blowers 2, 3, 6 and 7 always remain in fixed relationship to the planes of the louver vanes 38, 39, 42 and 43, respectively. As shown in Fig. 1 of the drawings, the blowers 4 and 8, which are of similar construction, are disposed at the approach end of the landing strip A, and the horizontally disposed upwardly inclined vanes 40 and 44, respectively, are arranged to effectively elevate the fog rearwardly of the blowers 1, 2, 3, 5, 6 and 7, effectively preventing the fog from being replaced rearwardly of the blowers casting air longitudinally of the landing strip A. It is to be noted that the blowers 4 and 8 are pivotally mounted on a vertical axis, and that the air being emitted from these blowers 4 and 8 through the vanes 40 and 44, respectively, always travels in an upwardly inclined direction, substantially parallel to the louver vanes 40 and 44, which lend a speed change to the air after passing from the blowers 4 and 8, respectively, for attaining the desired velocity required to lift the fog and elevate the same to reasonable ceiling for landing aircraft approaching the landing strip A. It will be here noted that the airflow outwardly of the louver vanes 40 and 44 is controlled by vertical vanes 45 and 46, respectively, which are pivoted on vertical axes of the pins 16a and 45a, as shown in Fig. 3 of the drawings. It will be here noted that all of the hereinbefore described individual blower assemblies may be readily mounted on or removed from conventional track laying vehicles, whereby support, transportation and use of the same may be greatly facilitated.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a fog-dispelling device of the class described, an airfield landing strip, a blower positioned adjacent the edge of said landing strip intermediate its ends, vertically disposed louver vanes having their planes directed at an angle of substantially forty-five degrees to the axis of the said blower, said blower and said vanes pivotally movable in unison about a vertical axis, second blower means along the edge of said landing strip having horizontally disposed vanes directed at an angle of substantially forty-five degrees to the axis of the blower, said second blower means and said vanes in connection therewith adjustable in pivotal relationship to the surface of said landing strip about a horizontal axis.

2. In a fog-dispelling device of the class described, an airfield landing strip, a blower positioned adjacent the edge of said landing strip intermediate its ends, vertically disposed louver vanes having their planes directed at an angle of substantially forty-five degrees to the axis of the said blower, said blower and said vanes pivotally movable in unison about a vertical axis, second blower means along the edge of said landing strip having horizontally disposed vanes directed at an angle of substantially forty-five degrees to the axis of the blower, said second blower means and said vanes in connection therewith adjustable in pivotal relationship to the surface of said landing strip about a horizontal axis, third blower means disposed near the approach end of said landing strip, having louver vanes horizontally disposed and at an angle of substantially forty-five degrees to the axis of said blower means, said third blower means and said vanes in connection therewith pivotally adjustable about a vertical axis.

3. In a fog-dispelling device of the class described, an airfield landing strip, a blower positioned adjacent the edge of said landing strip intermediate its ends, vertically disposed louver vanes having their planes directed at an angle of substantially forty-five degrees to the axis of the said blower, said blower and said vanes pivotally movable in unison about a vertical axis, second blower means along the edge of said landing strip having horizontally disposed vanes directed at an angle of substantially forty-five degrees to the axis of the blower, said second blower means and said vanes in connection therewith adjustable in pivotal relationship to the surface of said landing strip about a horizontal axis, third blower means disposed near the approach end of said landing strip, having louver vanes horizontally disposed and at an angle of substantially forty-five degrees to the axis of said blower means, said third blower means and said vanes in connection therewith pivotally adjustable about a vertical axis, said vanes in connection with said third blower means inclined upwardly.

4. In a fog-dispelling device of the class described, an airfield landing strip, a blower positioned adjacent the edge of said landing strip intermediate its ends, vertically disposed louver vanes having their planes directed at an angle of substantially forty-five degrees to the axis of the said blower, said blower and said vanes pivotally movable in unison about a vertical axis, second blower means along the edge of said landing strip having horizontally disposed vanes directed at an angle of substantially forty-five degrees to the axis of the blower, said second blower means and said vanes in connection therewith adjustable in pivotal relationship to the surface of said landing strip about a horizontal axis, third blower means disposed near the approach end of said landing strip, having louver vanes horizontally disposed and at an angle of substantially forty-five degrees to the axis of said blower means, said third blower means and said vanes in connection therewith pivotally adjustable about a vertical axis, said vanes in connection with said third blower means inclined upwardly, said third blower means and said vanes in connection therewith having rollers and a circular track on which said rollers traverse.

5. In a fog-dispelling device of the class described, an airfield landing strip, a blower positioned adjacent the edge of said landing strip intermediate its ends, vertically disposed louver vanes having their planes directed at an angle of substantially forty-five degrees to the axis of the said blower, said blower and said vanes pivotally movable in unison about a vertical axis, second blower means along the edge of said landing strip having horizontally disposed vanes directed at an angle of substantially forty-five degrees to the axis of the blower, said second blower means and said vanes in connection therewith adjustable in pivotal relationship to the surface of said landing strip about a horizontal axis, third blower means disposed near the approach end of said landing strip, having louver vanes horizontally disposed and at an angle of substantially forty-five degrees to the axis of said blower means, said third blower means and said vanes in connection therewith pivotally adjustable about a vertical axis, said vanes in connection with said third blower means inclined upwardly, said third blower means and said vanes in connection therewith having rollers and a circular track on which said rollers traverse, said second blower means having semi-circular arcuate gears, a motor on said second blower means having gear means in connection therewith, and a shaft, having gear means in connection therewith, operatively associated with said motor and said first mentioned semi-circular arcuate gears for pivoting said second mentioned blower means about a horizontal axis.

JOHN DEL REA DE LAND.

REFERENCES CITED

The following references are of record in the file of this patent:

UNITED STATES PATENTS

| Number | Name | Date |
| --- | --- | --- |
| 1,542,484 | Stevens | June 16, 1925 |
| 1,575,971 | Cobb | Mar. 9, 1926 |
| 1,611,857 | Feinberg | Dec. 21, 1926 |
| 1,793,719 | Reader | Feb. 24, 1931 |
| 1,796,693 | Schimmel | Mar. 17, 1931 |

FOREIGN PATENTS

| Number | Country | Date |
| --- | --- | --- |
| 326,836 | Germany | Oct. 2, 1920 |